United States Patent
Miyatake

(10) Patent No.: US 11,236,228 B2
(45) Date of Patent: Feb. 1, 2022

(54) EPOXY RESIN COMPOSITION

(71) Applicant: KANEKA CORPORATION, Osaka (JP)

(72) Inventor: Nobuo Miyatake, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/752,923

(22) Filed: Jan. 27, 2020

(65) Prior Publication Data

US 2020/0157340 A1    May 21, 2020

Related U.S. Application Data

(63) Continuation of application No. PCT/JP2018/026684, filed on Jul. 17, 2018.

(30) Foreign Application Priority Data

Jul. 28, 2017    (JP) .............................. JP2017-147012

(51) Int. Cl.
| | |
|---|---|
| *C08G 59/50* | (2006.01) |
| *C08L 63/00* | (2006.01) |
| *C08L 63/10* | (2006.01) |
| *C08F 279/02* | (2006.01) |
| *C08G 59/24* | (2006.01) |
| *C09J 163/00* | (2006.01) |
| *C09D 163/00* | (2006.01) |

(52) U.S. Cl.
CPC ............ *C08L 63/10* (2013.01); *C08F 279/02* (2013.01); *C08G 59/245* (2013.01); *C08G 59/504* (2013.01); *C08G 59/5073* (2013.01); *C08L 2205/03* (2013.01); *C08L 2207/53* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 3,208,980 A | 9/1965 | Gruver et al. | |
| 4,497,945 A | 2/1985 | Salloum et al. | |
| 4,778,851 A | 10/1988 | Henton et al. | |
| 6,063,839 A * | 5/2000 | Oosedo | C08J 5/24 523/206 |
| 2009/0170974 A1* | 7/2009 | De Schrijver | C08J 9/0023 521/157 |
| 2015/0218299 A1 | 8/2015 | Xie et al. | |
| 2015/0274962 A1 | 10/2015 | Gulyas et al. | |
| 2017/0275413 A1* | 9/2017 | Miyatake | C08L 71/02 |

FOREIGN PATENT DOCUMENTS

| | | | | |
|---|---|---|---|---|
| WO | WO-2011097009 A2 * | 8/2011 | ............... | C08L 63/00 |
| WO | WO-2016039232 A1 * | 3/2016 | ............... | C08L 71/02 |

OTHER PUBLICATIONS

Extended European Search Report issued in corresponding European Patent Application No. 18838864.9 dated Dec. 18, 2020 (6 pages).
International Search Report issued in International Application No. PCT/JP2018/026684, dated Oct. 2, 2018 (1 page).
Written Opinion issued in International Application No. PCT/JP2018/026684, dated Oct. 2, 2018 (3 pages).

* cited by examiner

*Primary Examiner* — Michael J Feely
(74) *Attorney, Agent, or Firm* — Osha Bergman Watanabe & Burton LLP

(57) ABSTRACT

An epoxy resin composition includes a polyol (A) having a hydroxyl value of 130 to 600 mgKOH/g, an epoxy resin (B), an amine curing agent (C), and a toughener (D). The epoxy resin composition may satisfy both $0.1 \leq Wt^2/Wp \leq 8.0$ and $0.1 \leq Wp \leq 8.0$, where Wp represents the polyol (A) content of the composition in % by weight and Wt represents the toughener (D) content of the composition in % by weight, relative to a total amount of the polyol (A), the epoxy resin (B), the amine curing agent (C), and the toughener (D).

14 Claims, No Drawings

EPOXY RESIN COMPOSITION

TECHNICAL FIELD

One or more embodiments relate to an epoxy resin composition, and a cured product therefrom, having excellent mechanical properties.

BACKGROUND

Epoxy resins have been used widely due to many merits such as excellent heat resistance, mechanical properties, and chemical resistance in the cure product. However, the molded product obtained from the epoxy resin may be very brittle and the epoxy resin requires improved toughness in many cases.

A method for adding various rubber components as modifiers to the epoxy resin has been studied and applied. The rubber components include liquid reactive rubber such as liquid butadiene-acrylonitrile rubber having a carboxyl group at a terminal (CTBN) and nitrile rubber (for example, patent document 1), core shell rubber (for example, patent document 2), polyether polyol (for example, patent document 3), and combinations thereof (for example, patent document 4).

Patent Document 1: U.S. Pat. No. 3,208,980
Patent Document 2: U.S. Pat. No. 4,778,851
Patent Document 3: U.S. Pat. No. 4,497,945
Patent Document 4: U.S. patent application publication No. 2015/0218299

The epoxy resin may also require mechanical properties such as flexural modulus and flexural strength. In the case where the epoxy resin is mixed with the above rubber components, mechanical properties such as flexural modulus (rigidness) and flexural strength are decreased even if toughness is improved. In addition, in the case where the epoxy resin is mixed with a polyol, the heat resistance is deteriorated in some cases even if the flexural modulus and the flexural strength are improved.

In Patent Document 4, not only the heat resistance is lessened, but also the fracture toughness, the flexural modulus and the flexural strength are not satisfied sufficiently. Therefore, it has been hard to accomplish improvements of the toughness and the flexural modulus, the flexural strength at the same time without impairing the heat resistance in the cured product of the epoxy resin.

SUMMARY

One or more embodiments provide an epoxy resin composition and a cured product therefrom having excellent toughness, high flexural modulus, and high flexural strength, without deteriorating heat resistance.

One or more embodiments may be as follows.

1) An epoxy resin composition comprising a polyol (A) having a hydroxyl value of 130 to 600 mgKOH/g, an epoxy resin (B), an amine curing agent (C), and a toughener (D),
wherein the epoxy resin composition satisfies the following numerical formulas (1) and (2) when a total amount of the polyol (A), the epoxy resin (B), the amine curing agent (C), and the toughener (D) is 100% by weight,
wherein in the following numerical formulas, Wp represents % by weight of the polyol (A), and Wt represents % by weight of the toughener (D).

$$0.1 \leq Wt^2/Wp \leq 8.0 \quad \text{Numerical formula (1):}$$

$$0.1 \leq Wp \leq 8.0 \quad \text{Numerical formula (2):}$$

2) The epoxy resin composition according to 1), wherein the polyol (A) has a number average molecular weight of 100 or more and less than 1000.
3) The epoxy resin composition according to 1) or 2), wherein the polyol (A) is a polyether polyol or a polycarbonate polyol.
4) The epoxy resin composition according to any one of 1) to 3), wherein the polyol (A) is at least one selected from the group consisting of a polyoxypropylene diol, a polyoxypropylene triol, a polyoxybutylene diol, a polyoxybutylene triol, and a polycarbonate diol.
5) The epoxy resin composition according to any one of 1) to 4), wherein the toughener (D) is at least one selected from the group consisting of a core shell polymer containing a core layer and a shell layer grafted on the core layer, a butadiene-acrylonitrile copolymer, and a polyalkyleneoxide having no hydroxyl group at a terminal.
6) The epoxy resin composition according to 5), wherein the toughener (D) is the core shell polymer having the number average particle diameter of 0.01 to 0.6 µm.
7) The epoxy resin composition according to 5) or 6), wherein the toughener (D) is the core shell polymer, and the core layer comprises at least one selected from the group consisting of a diene rubber, a (meth)acrylate rubber, an organosiloxane rubber, a styrene polymer, and a (meth)acrylate polymer.
8) The epoxy resin composition according to any one of 5) to 7), wherein the toughener (D) is the core shell polymer, and the polymer constituting the shell layer has a glass transition temperature of −40° C. to 60° C.
9) The epoxy resin composition according to any one of 5) to 8), wherein the toughener (D) is the core shell polymer, and the polymer constituting the shell layer comprises 20 to 90% by weight of a constituting unit of an alkyl (meth)acrylate having a linear or branched alkyl group of 4 to 10 carbon atoms.
10) The epoxy resin composition according to any one of 5) to 9), wherein the toughener (D) is the core shell polymer, and an amount of the core layer is 70 to 95% by weight per 100% by weight of the core shell polymer.
11) The epoxy resin composition according to any one of 1) to 10), wherein an amount of the amine curing agent (C) is 5 parts by weight or more per 100 parts by weight of the epoxy resin.
12) A cured product of the epoxy resin composition according to any one of 1) to 11).
13) The cured product according to 12), wherein the fracture toughness as measured by ASTM 5045 is 250 J/m² or more.
14) The cured product according to 12) or 13), wherein the flexural modulus as measured by JIS 7171 is more than 2.58 GPa, the flexural strength as measured by JIS 7171 is more than 100 MPa, and a glass transition temperature as measured by differential scanning calorimeter is 100° C. or more.

The cured product obtained from the epoxy resin composition of one or more embodiments has excellent toughness, high flexural modulus, and high flexural strength without deteriorating heat resistance.

DETAILED DESCRIPTION

The epoxy resin composition of one or more embodiments contains a polyol (A) having a hydroxyl value of 130 to 600 mgKOH/g, an epoxy resin (B), an amine curing agent (C), and a toughener (D), and contents of the polyol (A) and the toughener (D) satisfy given formulas. Conventionally, the polyol has been used to decrease a viscosity of the epoxy resin composition and improve toughness of the cured product formed from the epoxy resin composition. In addition, the polyol has been used in combination with the toughener, and it is difficult to sufficiently improve the toughness of the epoxy resin composition while the mechanical properties such as high flexural modulus and flexural strength of the epoxy resin composition are maintained.

Surprisingly, in the case where the epoxy resin composition of one or more embodiments containing a given polyol and toughener in given amounts is cured with the amine curing agent, the toughness, the flexural modulus, and the flexural strength of the cured product formed from the epoxy resin composition can be improved at the same time without impairing the heat resistance. In the many cases, the effects of one or more embodiments are extremely useful because the flexural modulus and the flexural strength are decreased in some cases when the toughness is improved.

Hereinafter, the epoxy resin composition of one or more embodiments is explained in detail.

<Polyol (A)>

The polyol (A) used in one or more embodiments is a compound having two or more hydroxyl groups in a molecule. The polyol (A) includes known polyols such as polyether polyol, polyester polyol, polycarbonate polyol, which are used as raw materials. The polyol (A) may be used individually or in two or more polyols. The polyol may have two functional groups or three functional groups and the polyol preferably has two functional groups.

The polyol (A) of one or more embodiments has a hydroxyl value of 130 to 600 mgKOH/g, preferably 160 to 590 mgKOH/g, and more preferably 190 mgKOH/g or ore. When the polyol having the above range of the hydroxyl value is used, there is the tendency to largely improve mechanical properties such as flexural modulus and flexural strength and prevent the decrease of toughness. In other words, there is the tendency to deteriorate the balance between the mechanical properties and the toughness in both cases of too low hydroxyl values or too high hydroxyl values. In some cases, it is not preferable that the polyol (A) having a reactive group such as an epoxy group and an amine group is used. When the polyol having a reactive group is used, it is difficult to obtain the effects of one or more embodiments due to the participation of the reactive group to the curing reaction.

The polyether polyol of one or more embodiments includes a random or block copolymer and the like obtained by ring-opening polymerizing ethylene oxide, propylene oxide, butylene oxide, styrene oxide and the like under the presence of one or two or more active hydrogen-containing initiator (s), and a mixture thereof. The active hydrogen-containing initiator includes diols such as ethylene glycol, diethylene glycol, propylene glycol, dipropylene glycol, 1,3-butane diol, 1,4-butane diol, 1,6-hexane diol, neopentyl glycol, bisphenol A; triols such as trimethylol ethane, trimethylol propane, glycerin; sugars such as monosaccharide, oligosaccharide, polysaccharide.

The polyester polyol of one or more embodiments includes a polymer obtained by condensating diprotic acids and anhydrides thereof such as maleic acid, fumaric acid, adipic acid, sebacic acid, phthalic acid, dodecanedioic acid, isophthalic acid, azelaic acid, with polyhydric alcohols such as ethylene glycol, propylene glycol, 1,4-butandiol, 1,6-hexandiol, diethylene glycol, dipropylene glycol, neopentyl glycol, 3-methyl-1,5-pentanediol under the presence of the esterification catalyst in the range of the temperature of 150° C. to 270° C.

The concrete examples of the polycarbonate polyol include a polymer obtained by condensating a reaction product of diols such as 1,4-butanediol, 1,6-hexanediol, neopentylglycol, 1,8-octanediol, 1,9-nonanediol, 1,4-cyclohexanedimethanol, 2-methylpropanediol, dipropyleneglycol, diethyleneglycol or these diols with dicarboxylic acids such as oxalic acid, malonic acid, succinic acid, adipic acid, azelaic acid, hexahydrophthalic acid, and aromatic carbonates or aliphatic carbonates such as diphenylcarbonate, bis (chlorophenyl)carbonate, dinaphthyl carbonate, phenyl toluyl carbonate, phenylchlorophenylcarbonate, 2-tolyl-4-tolylcarbonate, dimethylcarbonate, diethylcarbonate, diethylenecarbonate, ethylene carbonate, and a compound having two or more carbonate structures in a molecule such as those obtained by transesterification of alkylenecarbonate and alkyleneglycol.

Among these, the polyol (A) of one or more embodiments is preferably a polyether polyol or a polycarbonate polyol. The polyol (A) is particularly preferably at least one selected from polyoxypropylenepolyol such as polyoxypropylenediol and polyoxypropylenetriol, polyoxybutylenepolyol such as polyoxybutylenediol and polyoxybutylenetriol, and polycarbonatediol in the viewpoint of the ease of the handling and the mechanical properties. The polyoxypropylenepolyol may include those containing oxyethylene unit of less than 40% by weight in the polyoxypropylenepolyol such as polyoxypropylenepolyol-ethyleneoxide adduct in which an ethyleneoxide is added to a terminal of the polyoxypropylenepolyol. In addition, the polyoxybutylenediol may contain those containing oxy-3-methylbutylene unit of less than 40% by weight in the polyoxybutylenediol.

The number average molecular weight of the polyol (A) of one or more embodiments is preferably 100 or more and less than 1000, more preferably 800 or less, and even preferably 600 or less. In the case where the number average molecular weight is 1000 or more, the flexural modulus and the flexural strength of the cured product are decreased in some cases.

An amount of the polyol (A) of one or more embodiments may be those satisfying the numerical formula (2) as set forth below.

<Epoxy Resin (B)>

As the epoxy resin (B) of one or more embodiments, any epoxy resin can be used as long as it has two or more epoxy groups in the molecule.

For example, epoxy resins such as glycidyl ether-type epoxy resins such as bisphenol A diglycidyl ether and bisphenol F diglycidyl ether; cycloaliphatic-type epoxy resins such as 3,4-epoxycyclohexylmethyl carboxylate and 1,4-cyclohexanedimethanol diglycidyl ether; linear-aliphatic epoxy resins such as 1,4-butanediol diglycidyl ether, 1,6-hexanediol diglycidyl ether and polypropylene glycol diglycidyl ether; glycidyl ester-type epoxy resins such as hexahydrophthalic acid glycidyl ester; glycidyl amine-type epoxy resin such as tetraglycidyl aminodiphenyl methane, glycidyl compound of xylene diamine, triglycidyl aminophenol, glycidyl aniline; polysiloxane-type epoxy resins having an epoxy group at the end or side chain of polydimethylsiloxane; phenol novolac-type epoxy resins; cresol novolac-type epoxy resins; triphenylglycidyl ether methane, tetraphenylglycidyl ether methane; brominated phenol novolac-type epoxy resins; dicyclopentadienenovolac-type epoxy resins; and naphtholnovolac-type epoxy resins can be used. These epoxy resins may be used individually, or used in combination.

A reactive diluent having one epoxy group in a molecule or having an oxetane group in a molecule may be added to the epoxy resin (B) of one or more embodiments. The reactive diluent has effects of reducing the viscosity of the epoxy resin composition. Preferably, the reactive diluent is used in an amount of up to 20 parts by weight per 100 parts by weight of the epoxy resin. When the reactive diluent is used in an excessive amount, the mechanical properties of a cured product are lessened.

The reactive diluent having one epoxy group in the molecule includes alkyl monoglycidyl ether such as alkyl glycidyl ether having the carbon atoms of 8 to 14 such as butyl glycidyl ether, 2-ethyl hexyl glycidyl ether and the like, phenol monoglycidyl ether such as phenyl glycidyl ether, nonyl phenyl glycidyl ether and the like. These reactive diluents may be used in the combination of two or more reactive diluents.

Among these, glycidyl ether-type epoxy resins, linear-aliphatic epoxy resins are preferable. It is preferable that the epoxy resin contains bisphenol A diglycidyl ether and/or bisphenol F diglycidyl ether in an amount of 70% by weight or more, preferably 100% by weight in the viewpoint of the effects of one or more embodiments.

An amount of the epoxy resin (B) of one or more embodiments is preferably 35 to 90% by weight, more preferably 40 to 85% by weight, and even preferably 45 to 80% by weight per 100% by weight of the epoxy resin composition.

In addition, an amount of the epoxy resin (B) may be more than 90% by weight and less than 100% by weight, and 91% by weight or more or 92% by weight or more per 100% by weight of the epoxy resin composition.

<Amine Curing Agent (C)>

The effects of one or more embodiments result from the amine curing agent. On the contrary, the effects of one or more embodiments cannot be obtained with the use of the acid anhydride curing agent.

As the amine curing agent (C) of one or more embodiments, conventionally known epoxy curing agents can be widely used. The amine curing agent (C) includes, for example, aliphatic amines such as diethylaminopropylamine, hexamethylenediamine, methylpentamethylenediamine, trimethylhexamethylenediamine, guanidine, oleylamine and the like; alicyclic amines such as menthane diamine, isophorone diamine, norbornane diamine, piperidine, N, N'-dimethylpiperazine, N-aminoethylpiperazine, 1,2-diaminocyclohexane, bis (4-amino-3-methylcyclohexyl) methane, bis (4-aminocyclohexyl) methane, polycyclohexylpolyamine, 1,8-diazabicyclo [5,4,0] undecene-7 (DBU) and the like; amines having an ether bond such as 3,9-bis (3-aminopropyl)-2,4,8,10-tetraoxaspiro [5,5] undecane (ATU), morpholine, N-methylmorpholine, polyoxypropylene diamine, polyoxypropylene triamine, polyoxyethylene diamine and the like; hydroxyl group-containing amines such as diethanolamine, triethanolamine; polyamidoamines such as polyamide obtained by reacting dimer acid with polyamine such as diethylenetriamine or triethylenetetramine, polyamide obtained by polycarboxylic acid other than dimer acid and the like; imidazoles such as 2-ethyl-4-methylimidazole and the like; dicyandiamide; epoxy-modified amine obtained by reacting the amines with an epoxy compound, mannich modified amine obtained by reacting the amines with formalin and phenols, michael addition modified amine, modified amines such as ketimine and the like. These curing agents may be used individually or in combination of two or more kinds.

In order to accelerate the curing by the amine curing agent, in one or more embodiments a curing accelerator may be used together with the curing agent. When the curing accelerator is used, the curing accelerator is regarded to be the amine curing agent (C) containing both the amine curing agent and the curing accelerator. Examples of the curing accelerator include tertiary amines such as triethylamine and benzyldimethylamine; imidazoles such as 2-methylimidazole and 2-ethyl-4-methylimidazole; hydroxyl group-containing aromatic compound such as nonyl phenol, benzyl alcohol; organic phosphorus compounds such as triphenylphosphine, tri-p-tolylphosphine and triphenylphosphite; quaternary phosphonium salts such as tetraphenylphosphonium tetraphenylborate, tetraphenylphosphonium tetra-p-tolylborate, tetraphenylphosphine bromide, tetra-n-butylphosphonium bromide and tetra-n-butylphosphonium-o,o-diethylphosphorodithioate; diazabicycloalkenes such as 1,8-diazabicyclo[5.4.0]undecene-7 and organic acid salts thereof; organic metal compounds such as zinc octylate, tin octylate and aluminum acetylacetone complexes; quaternary ammonium salts such as tetraethylammonium bromide and tetrabutylammonium bromide; boron compounds such as boron trifluoride and triphenyl borate; and metal halogen compounds such as zinc chloride and stannic chloride. Moreover, the latent curing accelerator represented by microcapsule-type latent accelerators in which the surface of a high melting point imidazole compound, dicyandiamide, or a phosphorus-based or phosphine-based accelerator is coated with a polymer, amine salt-type latent curing accelerators, and high-temperature-dissociative thermally cationic polymerizable latent curing accelerators such as Lewis acid salts and Broensted acid salts can be used. These curing accelerators can be used individually or in mixture of two or more thereof.

An amount of the amine curing agent is dependent on the chemical properties of the curing agent and the given properties of the epoxy resin composition and the cured product. For example, in one or more embodiments it is preferable that an amount of the amine curing agent is adjusted such that an amine active hydrogen equivalent of the amine curing agent is 0.7 to 1.3 per one epoxy group equivalent in a total component contained in the epoxy resin composition.

The amount of the amine curing agent (C) of one or more embodiments is preferably 5 parts by weight or more, more preferably 10 parts by weight or more, even preferably 15 parts by weight or more, and preferably 100 parts by weight or less, more preferably 70 parts by weight or less per 100 parts by weight of the epoxy resin.

In addition, in one or more embodiments the amount of the amine curing agent (C) may be more than 0 part by weight and less than 5 parts by weight, 1 part by weight or more and 4.5 parts by weight or less.

It is preferable that a curing accelerator is used in an amount of 0.01 to 10 parts by weight per 100 parts by weight of the epoxy resin.

<Toughener (D)>

The toughener (D) of one or more embodiments is not limited particularly as long as the toughener is used as a known toughener of the epoxy resin. The toughener (D) is preferably a polymer polymerized with two or more monomers at one step or two or more steps and a linear or branched polymer having an ether bond, and the like. The toughener (D) is more preferably a butadiene-acrylonitrile copolymer, a polyalkylene oxide having no hydroxyl group at a terminal (polyalkylene oxide in which a hydroxyl group at a terminal is substituted with), a core shell polymer, and the like in the viewpoint of high toughness. Among these, the polyalkylene oxide having no hydroxyl group at a terminal and the core shell polymer are even preferably in the viewpoint of more toughness than that of the butadiene-acrylonitrile copolymer. The core shell polymer is particularly preferably in the viewpoint of most excellent toughness.

The butadiene-acrylonitrile copolymer of one or more embodiments is preferably butadiene-acrylonitrile copolymer having a carboxyl group, an epoxy group, or an amino group at one or both of terminal in the viewpoint of the compatibility with the epoxy resin. An amount of the acrylonitrile group is 15 to 30% by weight in the copolymer in the viewpoint of the compatibility with the epoxy resin. Particularly, an adduct of butadiene-acrylonitrile copolymer having carboxyl groups at both terminals with the epoxy resin is more preferably in the viewpoint of high toughness. An amount of butadiene-acrylonitrile copolymer is 20 to 60% by weight per 100% by weight of the adduct.

Concrete examples of the adduct include EPON (registered trademark) Resin 58005, EPON (registered trademark) Resin 58006, manufactured by Hexion Inc., HyPox (registered trademark) RA1340, HyPox (registered trademark) RA840, manufactured by CVC thermoset specialties, and the like.

The end-capped polyalkylene oxide (A) of one or more embodiments has a number average molecular weight of 1500 to 5000 (preferably 2000 to 4000), and its main chain structure may be a polymer having a structure represented by —R—O— as a repeating unit. R may be a divalent organic group (preferably a divalent hydrocarbon, more preferably a divalent aliphatic hydrocarbon, even preferably an alkylene group) having 1 to 20 of carbon atoms (preferably 1 to 10 of carbon atoms, more preferably 1 to 6 of carbon atoms).

Further, the polymer may be a homopolymer in which all of repeating units are the same or a copolymer containing two or more types of repeating units. Further, the polymer may have the branched structure in the main chain.

However, it is preferable that an amount of the —R—O— unit, wherein R has 3 or more of carbon atoms, is 80% by weight or more per total weight. When the amount of the above —R—O— is smaller, the toughness of the cured product of the epoxy resin tends to be poor. A concrete example of the alkylene group contained in R includes —CH$_2$CH$_2$—, —CH(CH$_3$) CH$_2$—, —CH$_2$CH$_2$CH$_2$CH$_2$—, —CH$_2$CH(CH$_3$) H$_2$CH$_2$—, —CH$_2$C(CH$_3$)$_2$ CH$_2$— and the like. R is particularly preferably —CH(CH$_3$)CH$_2$—, —CH$_2$CH$_2$CH$_2$CH$_2$—, and —CH$_2$CH(CH$_3$) CH$_2$CH$_2$—.

A concrete example of —R—O— includes polypropylene oxide, polypropylene oxide containing a small amount of oxyethylene unit, polybutylene oxide, oxy-3-methyltetramethylene/oxybutylene copolymer containing oxy-3-methyltetramethylene unit and the like. Polypropylene oxide, polybutylene oxide, oxy-3-methyltetramethylene/oxybutylene copolymer containing oxy-3-methyltetramethylene unit is preferred from the viewpoint that the reduction of Tg is low.

Among them, the ends of the polyalkylene oxide having no hydroxyl group at a terminal are capped with preferably a hydrocarbon group such as an alkyl group of carbon atoms 1 to 8, an aryl group, an allyl group, more preferably an allyl group. Preferably 50% or more, even preferably 80% or more of the total ends of the polyalkylene oxide (A) may be capped with the hydrocarbon group. Remaining ends of the polyalkylene oxide (A) may be capped with hydroxyl group. When the ratio of the hydroxyl group in all ends increases, toughness can be further decreased in some cases.

A concrete example of the alkyl group includes —CH$_3$, —CH$_2$CH$_3$, —CH$_2$CH$_2$CH$_3$, —CH$_2$CH$_2$CH$_2$CH$_3$, —CH$_2$CH(CH$_2$CH$_3$) CH$_2$CH$_2$CH$_2$CH$_3$ and the like. A concrete example of the aryl group includes —C$_6$H$_5$, —C$_6$H$_4$—CH$_3$ and the like. A concrete example of the allyl group includes —CH$_2$—CH=CH$_2$, —CH$_2$—C(CH$_3$)=CH$_2$ and the like. These end structures may be the same or different. Also, these polyalkylene oxides may be used individually, or two or more of these may be used in combination.

The core shell polymer of one or more embodiments is a particulate polymer having at least two layers. An amount of the core layer in the core shell polymer is preferably from 70 to 95% by weight, and more preferably from 80 to 93% by weight, per 100% by weight of the core shell polymer in the view of mechanical characteristic. In the case where the amount of the core layer is smaller, the viscosity of the epoxy resin composition tends to increase. In the case where the amount of the core layer is too large, it is difficult to prepare the core shell polymer (it is difficult to collect the core shell polymer from a solution after reaction in the practical form even if the core shell polymer can be synthesized). The amount of the core layer in the core shell polymer can be measured with absorbance ratio in spectrum from infrared spectroscopy.

The core shell polymer of one or more embodiments has a number average particle diameter of preferably 0.01 to 0.6 µm, more preferably 0.03 to 0.5 µm, and even preferably 0.05 to 0.4 µm. In order to obtain the core shell polymer having such an average particle diameter, an emulsion polymerization method is suitable, but when the average particle diameter is too large or too small, economically and industrially producing the core shell polymer is difficult. The number average particle diameter can be measured using Microtrack UPA 150 (manufactured by Nikkiso Co., Ltd.) and the like.

The core shell polymer of one or more embodiments preferably has a methyl ethyl ketone (MEK) insoluble matter, an amount of the insoluble matter (MEK insoluble content) is preferably 95% by weight or more, more preferably 97% by weight or more, and even preferably 98% by weight or more. In the case where the MEK insoluble content is less than 95% by weight, the viscosity of the epoxy resin composition tends to increase and the handling deteriorates. In the present specification, the method for obtaining the MEK insoluble matter of the core shell polymer is as follows. 2 g of the powder or the film of the core shell polymer is weighed and immersed in 100 g of MEK at 23° C. for 24 hours. Thus, obtained MEK insoluble matter is collected to dry and weigh, and a weight ratio (%) to a weight of the core shell polymer used in the measurement is calculated as MEK insoluble content.

The core shell polymer of one or more embodiments is preferably a polymer including a core layer including a crosslinked polymer and a shell layer including a polymer grafted polymerized on the core layer. That is, the shell polymer is preferably chemically bonded to the core polymer. A monomer used in the formation of the shell layer is graft-polymerized on the core polymer for forming the core layer, so that the shell layer covers on a part or the whole of the surface of the core layer.

It is preferable that the core layer of one or more embodiments is at least one selected from the group consisting of a diene rubber, a (meth) acrylate rubber, an organosiloxane rubber, a styrene polymer and a (meth) acrylate polymer. Among them, the core layer is more preferably a diene rubber, a (meth) acrylate rubber, and an organosiloxane rubber. In one or more embodiments, (meth) acrylate means acrylate and/or methacrylate.

The core layer of one or more embodiments is preferably a crosslinked polymer having the rubber property in order to improve toughness of the epoxy resin composition. In order to exhibit the rubber property in the core layer, the core layer has a glass transition temperature (hereinafter, the glass transition temperature is referred to as Tg in some case) of preferably 0° C. or less, more preferably −20° C. or less, and particularly preferably −40° C. or less.

Tg can be measured with dynamic viscoelastic measuring method or differential scanning calorimetry.

A polymer capable of forming the core layer having the rubber property includes a natural rubber, a rubber polymer comprising from 50 to 100% by weight of at least one monomer (first monomer) selected from a diene monomer (conjugated diene monomer) and a (meth)acrylate monomer and from 0 to 50% by weight of other polymerizable vinyl monomer (second monomer), a polysiloxane rubber, or combination thereof. The diene rubber polymerized with the diene monomer is preferable in the view of highly improving toughness. The core layer is preferably the (meth) acrylate rubber (also referred to as acrylic rubber) in the case where a balance of toughness, weather resistance, and economy is required. It is preferable that the core layer is the polysiloxane rubber, in the viewpoint of improving toughness at low temperature.

A monomer (conjugated diene monomer) for constituting the diene rubber used in the core layer includes 1,3-butadiene, isoprene, 2-chrolo-1,3-butadiene, 2-methyl-1,3-butadiene and the like. These may be used individually or in combination of two or more monomers.

From the viewpoint of highly improving toughness, in one or more embodiments a butadiene rubber polymerized with 1,3-butadiene, a butadiene-styrene rubber of a copolymer polymerized with 1,3-butadiene and styrene, or a butadiene-acrylate rubber of a copolymer polymerized with 1,3-butadiene and butylacrylate or 2-ethylhexylacrylate is preferable, a butadiene rubber is more preferable. In addition, a butadiene-styrene rubber is more preferable in the view of improving the transparency of the epoxy resin composition obtained from the adjustment of refractive index and improving the balance between the appearance and the toughness. In addition, butadiene-acrylate rubber is preferable, because the weather resistance is improved by decreasing the content of butadiene having double bonds in the butadiene-acrylate rubber by the introduction of the acrylate when such characteristic is required.

A monomer for constituting the (meth)acrylate rubber (also referred to as acrylic rubber) used in the core layer of one or more embodiments includes alkyl (meth)acrylates such as methyl(meth)acrylate, ethyl(meth)acrylate, butyl (meth)acrylate, 2-ethylhexyl(meth)acrylate, octyl(meth) acrylate, dodecyl(meth)acrylate, stearyl(meth)acrylate, behenyl(meth)acrylate; aromatic ring containing (meth) acrylates such as phenoxy ethyl(meth) acrylate, benzyl (meth)acrylate; hydroxyalkyl(meth)acrylates such as 2-hydroxyethyl(meth)acrylate, 4-hydroxybutyl(meth)acrylate; glycidyl (meth)acrylates such as glycidyl (meth)acrylate and glycidyl alkyl (meth)acrylate; alkoxyalkyl(meth)acrylates; allylalkyl(meth)acrylates such as allyl(meth)acrylate, and allylalkyl(meth)acrylate; multifunctional (meth)acrylates such as monoethylene glycol di(meth)acrylate, triethylene glycol di(meth)acrylate, tetraethylene glycol di(meth)acrylate and the like. These (meth)acrylate monomers may be used individually or in combination of two or more (meth) acrylate monomers. The monomer is preferably ethyl (meth) acrylate, butyl (meth) acrylate, and 2-ethylhexyl (meth) acrylate.

A vinyl monomer (second monomer) polymerizable with the first monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene; a multifunctional monomer such as diallylphthalate, triallylcyanurate, triallylisocyanurate, divinylbenzene. The vinyl monomer may be used individually or in combination of two or more vinyl monomers. The monomer is particularly preferably styrene.

An organosiloxane rubber that can constitute the core layer includes, for example, an organosiloxane polymer including an alkyl or aryl disubstituted silyloxy unit such as dimethylsiloxane, diethylsiloxane, methylphenylsiloxane, diphenylsiloxane, dimethylsiloxane-diphenylsiloxane; an organosiloxane polymer including an alkyl or aryl monosubstituted siloxane unit such as an organohydrogensiloxane in which a part of the side chain of an alkyl is substituted with a hydrogen atom. These organosiloxane polymers may be used individually or in combination of two or more polymers. Furthermore, a composite rubber including a (meth)acrylate rubber/organosiloxane rubber in combination with a (meth)acrylate-type rubber and organosiloxane rubber may be used. Among them, dimethylsiloxane rubber, methylphenylsiloxane rubber and dimethylsiloxane/butylacrylate composite rubber are preferable in view of weatherability and mechanical properties, and dimethylsiloxane rubber and dimethylsiloxane/butylacrylate composite rubber are most preferable in the viewpoint that these are readily available and economical.

In one or more embodiments where the core layer includes the organosiloxane rubber, the core layer preferably includes at least 10% by weight or more of the organosiloxane polymer sites per 100% by weight of the entire core layer, in order not to impair the mechanical properties at low temperature.

In the core layer of one or more embodiments, it is preferable that a crosslinked structure is introduced in a polymer component polymerized with the above monomers and the organosiloxane polymer component in the view of retaining the dispersion stability of the core shell polymer in the epoxy resin composition. As methods for introducing the crosslinked structure, conventional methods can be used. A method for introducing the crosslinked structure to the polymer polymerized with the above monomer includes a method for adding a crosslinking monomer, such as a multifunctional monomer and a mercapto group-containing compound and the like, to a monomer for forming a polymer, and polymerizing these. In addition, a method for introducing the crosslinked structure to the organosiloxane polymer includes a method for combining partly a multifunctional alkoxysilane compound at polymerization, a method for introducing a reactive group such as a vinyl reactive group, a mercapto group, a methacryloyl group and the like to the organosiloxane polymer, and adding a polymerizable vinyl monomer or organic peroxide to cause radical reaction, and a method for adding a crosslinking monomer such as a multifunctional monomer and a mercapto group-containing compound to the organosiloxane polymer and polymerizing these.

The multifunctional monomer of one or more embodiments does not include butadiene, and includes allylalkyl (meth)acrylates such as allyl (meth)acrylate, allylalkyl (meth)acrylate; allyloxyalkyl(meth)acrylates; multifunctional(meth)acrylates having two or more (meth)acrylic groups such as (poly)ethylene glycol di(meth)acrylate, butanediol di(meth)acrylate, ethylene glycol di(meth)acrylate, triethylene glycol di(meth)acrylate, tetraethylene glycol di(meth)acrylate; diallyl phthalate, triallylcyanurate, triallylisocyanurate, divinylbenzene and the like. Allylmethacrylate, triallylisocyanurate, butanediol di(meth)acrylate and divinyl benzene are particularly preferable.

The core layer of one or more embodiments preferably has a glass transition temperature of more than 0° C., more preferably 20° C. or more, even preferably 50° C. or more, particularly preferably 80° C. or more, and most preferably 120° C. or more in the case where the balance between the toughness and the elastic modulus of the epoxy resin cured product is required.

A polymer capable of forming the core layer in which Tg is more than 0° C. includes a polymer composed of 50 to 100% by weight (preferably 65 to 99% by weight) of at least one kind of a monomer having Tg of more than 0° C. in homopolymer and 0 to 50% by weight (preferably 1 to 35% by weight) of at least one kind of a monomer having Tg less than 0° C. in homopolymer.

When Tg of the core layer is more than 0° C., it is preferable that the crosslinked structure is introduced in the core layer. Tg increases by the introduction of the crosslinked structure. The method of introducing the crosslinked structure includes the method mentioned above.

A monomer having Tg more than 0° C. in the homopolymer includes those containing the following one or more monomers without particularly limited. The monomer includes unsubstituted aromatic vinyl compounds such as styrene, 2-vinylnaphthalene; a substituted aromatic vinyl compounds such as α-methyl styrene; an alkyl-substituted aromatic vinyl compounds such as 3-methylstyrene, 4-methylstyrene, 2,4-dimethylstyrene, 2,5-dimethylstyrene, 3,5-dimethylstyrene, 2,4,6-trimethylstyrene; alkoxy-substituted aromatic vinyl compounds such as 4-methoxystyrene, 4-ethoxy styrene; halogenated aromatic vinyl compounds such as 2-chlorostyrene, 3-chlorostyrene; ester-substituted aromatic vinyl compounds such as 4-acetoxystyrene; hydroxyl-substituted aromatic vinyl compounds such as 4-hydroxystyrene; vinyl esters such as vinyl benzoate, vinylcyclohexanoate; halogenated vinyl compounds such as vinylchloro; aromatic monomers such as acenaphthalene, indene; alkyl methacrylates such as methyl methacrylate, ethyl methacrylate, isopropyl methacrylate; aromatic methacrylate such as phenyl methacrylate; methacrylates such as isobornyl methacrylate and trimethylsilyl methacrylate; methacrylic monomers including methacrylic acid derivatives such as methacrylonitrile and the like; acrylic acid esters such as isobornylacrylate, tert-butylacrylate; an acrylic monomer containing acrylic acid derivative such as acrylonitrile. Further, the monomer includes a monomer having Tg of 120° C. or more such as acrylamide, isopropylacrylamide, N-vinylpyrrolidone, isobornyl methacrylate, dicyclopentanylmethacrylate, 2-methyl-2-adamantylmethacrylate, 1-adamantylacrylate and 1-adamantylmethacrylate.

In one or more embodiments, the core layer may be composed of monolayer in some cases and may be composed of multilayers. In the case where the core layer is composed of multilayer, the polymer composition of each layers may be different each other.

That is, the core layer of one or more embodiments may be a core layer including two layers including a second layer polymerized with a different polymer composition on the surface of the first core layer, and a core layer including three layers including third layer polymerized with a different polymer composition on the surface of the core layer including two layers. When the second core layer of the core including two layers or the third core layer of the core including three layers is a polymer obtained by polymerizing a multifunctional monomer such as triallylisocyanurate as a main component, there is a merit that a shell polymer described below is easily grafted-polymerized. On the contrary, there is a demerit that the manufacture of the core layer including a multilayer structure becomes complicated.

The shell layer of one or more embodiments is at the outermost side of the core shell polymer, that is, the shell polymer plays a role of controlling the compatibility with the polyol (A), the epoxy resin (B) and the like, and effectively dispersing the core shell polymer.

Such a shell polymer is preferably grafted on the core layer. More precisely, it is preferable that a monomer used in the formation of the shell layer is graft-polymerized on the core polymer for forming the core layer, and the shell polymer is substantially and chemically bonded to the core polymer. That is, it is preferable that the shell polymer is formed by graft-polymerizing the monomer for forming the shell layer under the presence of the core polymer, and a part or all of the core polymer is covered with the shell polymer. Such a polymerization can be carried out by adding a monomer for constituting the shell polymer to a latex containing the core polymer prepared in the state of an aqueous latex, and polymerizing the monomer.

It is necessary to select a glass transition temperature (referred to as Tg in some cases) of the shell layer such that a polymer of the shell layer has preferably −40° C. to 60° C., more preferably −35° C. to 50° C., even preferably −30° C. to 40° C. in the viewpoint of obtaining the epoxy resin composition having excellent mechanical properties by using the monomer for forming the shell layer. When Tg of the polymer constituting the shell layer is small, there is the tendency to improve the flexural modulus and the flexural strength in some cases.

Tg of the polymer obtained from selected monomers can be obtained from handbooks, technical data or handbooks of various monomers provided by the providers, and the like. Relatively many data are described in the reference: Polymer Properties, pages 52 to 53, provided by Sigma-Aldrich Co. LLC. In addition, the following polymer and Tg can be used: polyacrylonitrile (Tg of 85° C. (358 K)), polyallylmethacrylate (Tg of 52° C. (325 K)) from technical material of BASF, poly(4-hydroxybutylacrylate) (Tg of −40° C. (233 K)) from technical material of Nihon Kasei Co. Ltd, and polyglycidylmethacrylate (Tg of 46° C. (319 K)) from technical material of SANESTERS CORPORATION. Tg of the copolymer may be calculated by using Tg of the homopolymer. Concretely, Tg of the copolymer is calculated from a Fox formula described in "ENCYCLOPEDIA OF POLYMER SCIENCE AND ENGINEERING", 1987, volume 7, page 539, published by John Wiley & Son. That is, $Tg_c$ of the copolymer may be calculated by substituting a glass transition temperature $Tg_n$ of the homopolymer of each monomers constituting the copolymer polymerized with m kinds of monomers and weigh ratio thereof $Wf_n$ (% by weight/100) in the numerical formula (3). The numerical formula (3) is defined by an absolute temperature (K) as a unit of Tg, and it is necessary to convert the absolute temperature to a Celsius temperature (° C.) by subtracting 273 from the resultant absolute temperature.

$$1/Tg_c = \sum_{n=1}^{n=m}(Wf_n/Tg_n)$$

Numerical formula (3)

For example, when a copolymer is polymerized with 50% by weight of styrene, 25% by weight of methylmethacrylate, 25% by weight of butyl acrylate, Tg is calculated as 318 (K) (45° C.) by substituted Tg of 373 K (100° C.) for polystyrene, Tg of 378 K (105° C.) for polymethylmethacrylate, Tg of 219 K (−54° C.) for polybutylacrylate and weight ratios thereof in the numerical formula (3).

The monomer for forming the shell layer of one or more embodiments is preferably a (meth)acrylate monomer, an aromatic vinyl monomer, a hydroxyl group-containing vinyl monomer, and an epoxy group-containing vinyl monomer in the viewpoint of the adjustment of Tg.

Among these, the (meth)acrylate monomer of one or more embodiments is more preferably an alkyl (meth)acrylate having a linear or branched alkyl group of carbon atoms 4 to 10. An amount of the (meth)acrylate monomer is preferably 20 to 90% by weight, and more preferably 25 to 85% by weight per a total amount of the monomers for forming the shell layer in the viewpoint of decreased viscosity of the epoxy resin composition.

A monomer for forming the shell layer of one or more embodiments may include a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group in the view of uniformly dispersing the core shell polymer in the epoxy resin.

It is particularly preferable to use an epoxy group-containing vinyl monomer or a hydroxyl group-containing vinyl monomer as a part of the monomer for forming the shell layer. These have a large effect of stabilizing the dispersion of the core shell polymer in the epoxy resin for a long time.

In one or more embodiments, the hydroxyl group-containing vinyl monomer or the epoxy group-containing vinyl monomer is contained in an amount of preferably 1 to 40% by weight, more preferably 2 to 35 b by weight, even preferably 2 to 20% by weight per 100% by weight of the monomers for forming the shell layer. When the hydroxyl group-containing vinyl monomer or the epoxy group-containing vinyl monomer is too much in the monomer for forming the shell layer, the dispersion of the core shell polymer in the epoxy resin tends to be unstable.

In addition, when a multifunctional monomer having two or more double bonds is used as the monomer for forming the shell layer of one or more embodiments, the crosslinked structure is introduced in the shell layer. As a result, the interaction of the core shell polymer and the epoxy resin (B) is decreased, and the viscosity of the epoxy resin composition can be decreased. Thus, it is preferable that the multifunctional monomer having two or more double bonds is used in some cases. On the other hand, there is the tendency to decrease the elongation of the cured product of the epoxy resin composition, and it is preferable that the multifunctional monomer having two or more double bonds is not used as the monomer for forming the shell layer in the case where the elongation is improved at maximum.

When the multifunctional monomer is used, the multifunctional monomer is included in an amount of preferably 0.5 to 10% by weight, and more preferably 1 to 5% by weight per 100% by weight of a monomer for forming the shell layer.

A concrete example of the (meth)acrylate monomer includes linear or branched alkyl group-containing (meth) acrylate monomer having carbon atoms of 4 to 10 such as methyl (meth)acrylate, ethyl (meth)acrylate, butyl (meth) acrylate, 2-methoxyethyl (meth)acrylate, 2-ethylhexyl (meth)acrylate, octyl (meth)acrylate and the like.

A concrete example of the aromatic vinyl monomer includes styrene, α-methyl styrene, p-methyl styrene, divinyl benzene and the like.

A concrete example of the hydroxyl group-containing vinyl monomer includes 2-hydroxyethyl (meth)acrylate, 4-hydroxybutyl (meth) acrylate and the like.

A concrete example of the vinyl monomer having an epoxy group includes glycidyl (meth)acrylate, 4-hydroxy butyl(meth)acrylate glycidyl ether, allyl glycidyl ether, and the like. Particularly, glycidyl methacrylate is preferable in the view of the stability and the reactivity.

A concrete example of the multifunctional monomer having two or more double bonds is exemplified by the same monomer as the above-mentioned multifunctional monomer. The multifunctional monomer is preferably allylmethacrylate, and triallylisocyanurate.

In one or more embodiments, it is preferable that the shell layer contains a polymer polymerized with the monomers for forming the shell layer, that is, 20 to 90% by weight (preferably 30 to 80% by weight, more preferably 35 to 70% by weight) of butyl acrylate, 20 to 70% by weight (preferably 25 to 65% by weight, more preferably 30 to 60% by weight) of methylmethacrylate, 1 to 20% by weight (preferably 1 to 15% by weight, more preferably 1 to 10% by weight) of 4-hydroxy butylacrylate, and 0 to 20% by weight of glycidyl(meth)acrylate per a total amount of 100% by weight.

In addition, it is preferable that the shell layer contains a polymer polymerized with the monomers for forming the shell layer, that is, 20 to 90% by weight (preferably 25 to 75% by weight, more preferably 30 to 60% by weight) of butyl acrylate, 20 to 70% by weight (preferably 25 to 65% by weight, more preferably 30 to 60% by weight) of methylmethacrylate, and 1 to 20% by weight (preferably 1 to 15% by weight, more preferably 1 to 10% by weight) of glycidyl(meth)acrylate per a total amount of 100% by weight.

Thus, the cured product having excellent mechanical properties can be obtained by the epoxy resin composition.

The shell layer of one or more embodiments may include other monomers in addition to the above monomers.

In one or more embodiments, an amount of the shell layer in the core shell polymer is preferably from 5 to 30% by weight, and more preferably from 7 to 20% by weight, per 100% by weight of the entire core shell polymer. When the amount of the shell layer is too large, the viscosity of the epoxy resin composition tends to be too high. When the amount of the shell layer is too low, the dispersion of the core shell polymer in the epoxy resin becomes difficult.

<Method for Preparing Core Shell Polymer>
(Method for Preparing Core Layer)

In the case where the polymer for forming the core layer as the constituent of the core shell polymer used in one or more embodiments is polymerized with at least one monomer (first monomer) selected from the diene monomer (conjugated diene monomer) and (meth) acrylate monomer, the core layer can be prepared according to emulsion polymerization, suspension polymerization, micro-suspension polymerization and the like, and for example methods described in WO2005/028546 can be used.

In the case where the polymer for forming the core layer comprises the organosiloxane polymer, the core layer can be prepared by emulsion polymerization, suspension polymerization, micro-suspension polymerization and the like, and for example methods described in EP1338625 can be used.

(Method of Preparing Shell Layer)

The shell layer of one or more embodiments can be formed by polymerizing a monomer for forming the shell layer by a known radical polymerization. In the case where the core layer is obtained as an emulsion of a precursor of the core shell polymer, it is preferable that the polymerization of the monomer for forming the shell layer is carried out by the emulsion polymerization, and for example the shell layer can be prepared according to methods of WO 2005/028546.

The following dispersants can be mentioned as examples of emulsifiers (dispersants) usable in the emulsion polymerization: various acids including alkyl or aryl sulfonic acid such as dioctylsulfosuccinic acid and dodecylbenzenesulfonic acid, alkyl or aryl ether sulfonic acid, alkyl or arylether sulfuric acid such as dodecylsulfuric acid, alkyl or arylether sulfuric acid, alkyl or aryl substituted phosphoric acid, alkyl or arylether substituted phosphoric acid, N-alkyl or arylsarcosinic acid such as dodecylsarcosinic acid, alkyl or arylcarboxylic acid such as oleic acid and stearic acid, and alkyl or arylether carboxylic acid, and anionic emulsifiers (dispersants) such as alkali metal salts or ammonium salts of these acids; nonionic emulsifiers (dispersants) such as alkyl or aryl-substituted polyethylene glycols; and polyvinyl alcohol, alkyl-substituted celluloses, polyvinyl pyrrolidone, derivatives of polyacrylic acid. Any of these emulsifiers (dispersants) may be used individually, or two or more of these may be used in combination.

The amount of the emulsifier (dispersant) is preferably as small as possible, but the dispersion stability of the core shell polymer in the aqueous latex should be secured. The emulsifier (dispersant) preferably has as high water solubility as possible. An emulsifier (dispersant) having high water solubility can be easily washed out with water, and thus its bad influence on the finally obtained polyol composition can be easily avoided.

Thermal decomposition initiator such as 2,2'-azobisisobutylonitrile, organic peroxide, hydrogen peroxide, potassium persulphate, and ammonium persulfate are well known as initiators of emulsion-polymerization. In one or more embodiments, the organic peroxide is particularly preferable.

The organic peroxides preferably include t-butylperoxy isopropyl carbonate, p-menthanehydroperoxide, cumenehydroperoxide, dicumyl peroxide, t-butyl hydroperoxide, di-t-butyl peroxide, di-t-hexyl peroxide, and the like. Among these, organic peroxides having a 10 hour half-life temperature (hereinafter also referred to as $T_{10}$) of 120° C. or more such as di-t-butyl peroxide having $T_{10}$ of 124° C., p-menthanehydroperoxide having $T_{10}$ of 128° C., cumenehydroperoxide having $T_{10}$ of 158° C., and t-butyl hydroperoxide having $T_{10}$ of 167° C. are preferably used, in the view of improving the amount of MEK insoluble matter of the core shell polymer.

In addition, redox type initiators such as organic peroxides in combination with reducing agents such as sodium formaldehyde sulfoxylate, glucose as needed, and transition metal salts such as ferrous sulfate as needed, further chelating agents such as disodium ethylenediaminetetraacetate as needed, further phosphorus-containing compounds such as sodium pyrophosphate as needed are preferably used.

In the case of polymerization using a redox type initiator, it is possible to carry out the polymerization even at a low temperature at which the organic peroxide does not substantially thermally decompose and to set the polymerization temperature in a wide range, and therefore such a polymerization is preferable.

In one or more embodiments, the amount of the initiator and the amounts of the reducing agent, the transition metal salt, the chelating agent when the redox type initiator is used can be used in known range in the art.

Also, in one or more embodiments a known chain transfer agent can be used. The chain transfer agent may be those used in the conventional emulsion polymerization without particularly limiting.

Concrete examples of the chain transfer agent include t-dodecyl mercaptan, n-octylmercaptan, n-tetradecylmercaptan, n-hexylmercaptan, and the like.

Known conditions of polymerization such as polymerization temperature, pressure, and deoxidation, are applicable to the polymerization.

In one or more embodiments, an amount of the toughener (D) is preferably 10 to 79% by weight, more preferably 15 to 75% by weight, and even preferably 20 to 70% by weight per 100% by weight of the polyol (A) and the toughener (D). When the amount of the toughener is out of the above range, at least one of the heat resistance, the toughness, the flexural modulus, and the flexural strength is deteriorated in some cases.

<Other Compounded Component>

In one or more embodiments, other compounded component can be used, if necessary. As other compounded component, compounded components used in conventional epoxy resin composition may be used and it is not particularly limited. The other compounded component includes for example, a filler such as silica or calcium carbonate, a dehydrating agent such as calcium oxide, a tracking resistance reducing agent/flame retardant such as aluminum hydroxide, a heat radiation agent such as aluminum oxide, a silane coupling agent, a defoaming agent, anti-settling agents, thixotropic agents, colorants such as pigments and dyes, extender pigments, ultraviolet absorbers, an antioxidant, a stabilizer (a gelling inhibitor), a plasticizer, a leveling agent, an antistatic agent, a flame retardant, lubricant, viscosity reducer, low shrinkage agent, organic filler, thermoplastic resin, desiccant, dispersant and the like.

Also, glass fiber, carbon fiber and the like used for fiber reinforced resin may be used. In particular, the silane coupling agent is particularly preferable because it improves the adhesion between the filler, the adhesive base material, glass fiber, carbon fiber and the like and the resin. A concrete example of the silane coupling agent includes 3-glycidyloxypropyltrimethoxysilane, 3-glycidoxypropylmethyldimethoxysilane, 3-aminopropyltrimethoxysilane, and the like. The amount used is preferably from 0.1 to 2% by weight per 100% by weight of the epoxy resin composition.

Further, since it is necessary to reduce air bubbles of the epoxy resin composition as much as possible, it is preferable to add an antifoaming agent during compounding. As the antifoaming agent, for example, it may be appropriately selected from antifoaming agents such as silicone type, fluorine type, acrylic type, polyoxyethylene type, polyoxypropylene type and the like. A concrete example of antifoaming agents includes BYK-A 500 and BYK-1790 manufactured by BYK Chemie. The amount used is preferably 0.01 to 4% by weight per 100% by weight of the epoxy resin composition.

When the epoxy resin composition of one or more embodiments includes a filler and the like, it is preferable to incorporate an anti-settling agent in order to enhance its storage stability. As the anti-settling agent, additives which increase the thixotropy of the epoxy resin composition, such as fumed silica, fine powder organic bentonite and the like are preferred. The use amount of the anti-settling agent is preferably 0.1 to 10% by weight per 100% by weight of the epoxy resin composition. These anti-settling agents may be used as thixotropy-imparting agents when it is compounded in adhesive. The use amount is preferably the same degree. Examples of the flame retardant include inorganic flame retardants such as aluminum hydroxide and magnesium hydroxide and the like, halogenated flame retardants such as tetrabromobisphenol A and its modified products, tetrabromophthalide and the like, phosphorus flame retardant such as triphenyl phosphate, bisphenol A bis (diphenyl) phosphate, reactive bisphenol A bis (diphenyl) phosphate, silicone flame retardants and the like. The flame retardant is preferably used in an amount of 1 to 200 parts by weight per 100 parts by weight of the epoxy resin (B).

<Method for Preparing Epoxy Resin Composition>

The epoxy resin composition of one or more embodiments comprises a polyol (A) having a hydroxyl value of 130 to 600 mgKOH/g, an epoxy resin (B), an amine curing agent (C), and a toughener (D), wherein the epoxy resin composition satisfies the following numerical formulas (1) and (2) when a total amount of the polyol (A), the epoxy resin (B), the amine curing agent (C), and the toughener (D) is 100% by weight, wherein in the following numerical formulas, Wp represents % by weight of the polyol (A), and Wt represents % by weight of the toughener (D).

$$0.1 \leq Wt^2/Wp \leq 8.0 \quad \text{Numerical formula (1):}$$

$$0.1 \leq Wp \leq 8.0 \quad \text{Numerical formula (2):}$$

In one or more embodiments, $Wt^2/Wp$ is a value obtained by multiplying Wt/Wp as the index of the flexural modulus (hereinafter, referred to as modulus) with Wt as the index of the toughness.

The reason that Wt/Wp is regarded as an index of excellent modulus is as follows.

The polyol (A) contributes to the improvement of modulus as mentioned above. On the other hand, the toughener (D) decreases modulus. Thus, the balance between an amount of the polyol and an amount of the toughener is important. When the amount of the polyol (A) is large, the modulus of the cured product becomes too high, and when the amount of the toughener (D) is large, the modulus of the cured product becomes too small. Therefore, a ratio (Wt/Wp) of the amount Wt of the toughener (D) to the amount Wp of the polyol (A) can be regarded to be an index of the excellent modulus.

In addition, since the toughener (D) contributes the improvement of the toughness, the amount Wt of the toughener (D) can be regarded as an index of good toughness.

We have studied a numerical formula such that the cured product has good balance between the modulus and the toughness. As a result, an index satisfying both the modulus and the toughness is found by defining $Wt^2/Wp$ on the basis of the multiplication of Wt/Wp (index of modulus) and Wt (index of toughness).

$Wt^2/Wp$ is 0.1 to 8.0, preferably 0.15 to 7.7, and more preferably 0.2 to 7.5. When the $Wt^2/Wp$ is out of the above range, the balance between mechanical property (flexural modulus) and toughness is deteriorated in some cases. Wp is 0.1 to 8.0, preferably 0.3 to 7.7, and more preferably 0.5 to 7.5. When Wp is too small, the balance between mechanical property and toughness is deteriorated in some cases. When Wp is too large, sufficient heat resistance is not obtained in some cases. In one or more embodiments, a range of Wt is obtained from the numerical formulas (1) and (2), and Wt is 0.1 to 8.0.

When the core shell polymer is used as the toughener (D) of one or more embodiments, it is preferable that the core shell polymer is dispersed in a state of primary particles in the polyol (A) or the epoxy resin (B) to prepare a dispersion, and the epoxy resin composition contains the dispersion in the viewpoint of easily controlling the viscosity of the epoxy resin composition. It is particularly preferable that the core shell polymer is dispersed in the polyol (A) in the viewpoint of the dispersion of the core shell polymer in a large amount and the decreased viscosity of the dispersion.

In one or more embodiments, the epoxy resin composition may contain a dispersion in which the core shell polymer is dispersed in the epoxy resin or a dispersion in which the core shell polymer is dispersed in the polyol.

In one or more embodiments, an amount of the core shell polymer is preferably 5 to 60% by weight, and more preferably 10 to 50% by weight per 100% by weight of the dispersion.

When the dispersion containing the epoxy resin is used, it is preferable that the shell layer of the core shell polymer is polymerized with at least epoxy group-containing vinyl monomer in the viewpoint of the decreased viscosity of the dispersion.

When the dispersion containing the polyol is used, it is preferable that the shell layer of the core shell polymer is polymerized with at least hydroxyl group-containing vinyl monomer in the viewpoint of the decreased viscosity of the dispersion.

An amount of the dispersion is preferably 0.5 to 40% by weight, more preferably 1 to 35% by weight, and even preferably 1.5 to 30% by weight per 100% by weight of the epoxy resin composition.

As the method for obtaining the dispersion with the core shell polymer dispersed in the polyol (A) or the epoxy resin (B) in a state of primary particles, various methods can be used, and examples thereof include a method in which the core shell polymer obtained in a state of aqueous latex is brought into contact with the polyol (A) or the epoxy resin (B), and unnecessary components such as water are then removed; and a method in which the core shell polymer is temporarily extracted in an organic solvent, the extract is then mixed with the polyol (A) or the epoxy resin (B), and the organic solvent is removed. The method described in WO 2005/028546 is preferably used. The specific method for producing the dispersion preferably includes, in order, a first step of mixing an aqueous latex (specifically, a reaction mixture after production of a core shell polymer by emulsification polymerization), which contains the core shell polymer, with an organic solvent having a solubility of 5% or more and 40% or less in water at 20° C., and then mixing the mixture with an excessive amount of water, aggregating the core shell polymer; a second step of separating and collecting the aggregated core shell polymer from the liquid phase, and then mixing the core shell polymer with an organic solvent again, obtaining an organic solvent solution of the core shell polymer; and a third step of mixing the organic solvent solution with the polyol (A) or the epoxy resin (B), and then distilling off the organic solvent.

In one or more embodiments, the polyol (A) or the epoxy resin (B) is preferably liquid at 23° C. in the view of easily carrying out the third step. The term "liquid at 23° C." means that the softening point is 23° C. or less, i.e. the polyol or the epoxy resin exhibits fluidity at 23° C.

To the composition in which particles of the core shell polymer are dispersed in the polyol (A) or the epoxy resin (B) as primary particles (hereinafter, also referred to as a "primary particle dispersion composition"), which is obtained by passing through the above-mentioned steps, the polyol (A) or the epoxy resin (B) is added while appropriately diluting the primary particle dispersion composition if necessary, further an amine curing agent (C) is additionally mixed, and if necessary, the above-mentioned other components are mixed to obtain the epoxy resin composition of one or more embodiments in which core shell polymers are dispersed.

On the other hand, in one or more embodiments the powdered core shell polymer obtained by performing solidification by a method such as salting-out and then drying can be redispersed in the polyol (A) or the epoxy resin (B) using a disperser having a high mechanical shearing force, such as three paint rolls, a roll mill or a kneader. Here, by giving a mechanical shearing force to a mixture of the polyol (A) or the epoxy resin (B) and the core shell polymer at a high temperature, the core shell polymer can be efficiently dispersed in the polyol (A) or the epoxy resin (B). The temperature used in the preparation of the dispersion is preferably 50 to 200° C., more preferably 70 to 170° C., even preferably 80 to 150° C., and particularly preferably 90 to 120° C. When the temperature is less than 50° C., the core shell polymer may not be sufficiently dispersed, and when the temperature is more than 200° C., the polyol (A), the epoxy resin (B), and the core shell polymer may be thermally degraded.

In addition, in the case where the polyalkylene oxide having no hydroxyl group at a terminal is used as the toughener (D), the polyalkylene oxide may be mixed with each of components.

Further, in the case where the butadiene-acrylonitrile copolymer is used as the toughener (D), the adduct of the copolymer with the epoxy resin is preferably used in the viewpoint of the high toughness. In the case, it is necessary to adjust an amount of the epoxy resin (B) because the epoxy resin contained in the adduct is included in the composition.

The epoxy resin composition of one or more embodiments may be prepared by mixing the polyol (A), the epoxy resin (B), the amine curing agent (C) and the toughener (D) as two liquid including an main component and the curing component. For example, the epoxy resin composition of one or more embodiments may be prepared by mixing the amine curing agent (C) as a curing agent with a mixed component of a polyol (A), an epoxy resin (B) and a toughener (D) an main components, or may be prepared by mixing a mixture of a polyol (A) and/or the core shell polymer and the amine curing agent (C) as a curing agent component and then mixing it with a main component including an epoxy resin (B).

<Cured Product>

One or more embodiments include a cured product formed from the epoxy resin composition. When the specific polyol (A) is used in combination with the toughener, the obtained cured product is excellent in mechanical properties and toughness.

The cured product formed from the epoxy resin composition of one or more embodiments containing 90% by weight or less of the epoxy resin has fracture toughness as measured by ASTM 5045 of preferably 250 $J/m^2$ or more, more preferably 300 $J/m^2$ or more, even preferably 350 $J/m^2$ or more, and preferably 2000 $J/m^2$ or less.

On the other hand, the cured product formed from the epoxy resin composition of one or more embodiments containing more than 90% by weight of the epoxy resin has fracture toughness as measured by ASTM 5045 of preferably 110 $J/m^2$ or more, more preferably 120 $J/m^2$ or more, and even preferably 130 $J/m^2$ or more.

In one or more embodiments, the cured product formed from the epoxy resin composition containing 90% by weight or less of the epoxy resin has flexural modulus as measured by JIS 7171 of preferably more than 2.58 GPa, more preferably 2.60 GPa or more, even preferably 2.61 GPa or more, and preferably 10 GPa or less.

On the other hand, the cured product formed from the epoxy resin composition containing more than 90% by weight of the epoxy resin has flexural modulus as measured by JIS 7171 of preferably more than 2.42 GPa, more preferably 2.43 GPa or more, and even preferably 2.44 GPa or more.

In one or more embodiments, the cured product formed from the epoxy resin composition containing 90% by weight or less of the epoxy resin has flexural strength as measured by JIS 7171 of preferably more than 100 MPa, more preferably 102 MPa or more, even preferably 104 MPa or more, and preferably 200 MPa or less.

On the other hand, the cured product formed from the epoxy resin composition containing more than 90% by weight of the epoxy resin has flexural strength as measured by JIS 7171 of preferably more than 72 MPa, and more preferably 74 MPa or more.

The cured product of one or more embodiments has a glass transition temperature as measured by differential scanning calorimetry of preferably 100° C. or more, more preferably 110° C. or more, and preferably 200° C. or less.

<Use>

The epoxy resin composition of one or more embodiments is suitable for various applications such as adhesives, paints, glass reinforced composite materials, carbon fiber reinforced composite materials and the like, because it can become to a cured product excellent in toughness, flexural modulus, and flexural strength.

The present application claims the benefit of priority to Japanese Patent Application Number 2017-147012 filed on Jul. 28, 2017. The entire contents of the specification of Japanese Patent Application Number 2017-147012 filed on Jul. 28, 2017 are hereby incorporated by reference.

EXAMPLES

Hereinafter, one or more embodiments will be described in detail with reference to Examples and Comparative Examples, but the present invention is not limited thereto, and the variation and the modification of the present invention without departing the gist described above and below are all included the technical scope of the present invention. In the following Examples and Comparative Examples, "part (s)" and "%" mean "part (s) by weight" and "% by weight", respectively.

The measurement and test employed in the following Synthetic Examples, Examples, and Comparative Examples are carried out as follows.

[1] Measurement of Number Average Particle Diameter of Polymer Fine Particle

A number average particle diameters (Mn) of the polymer fine particles dispersed in the aqueous latex were measured using a particle size analyzer (MICROTRAC (registered trademark) UPA 150, manufactured by Nikkiso Co., Ltd.). A measuring sample was used after diluting with deionized water.

[2] Measurement of MEK Insoluble Content of Core Shell Polymer 2 g of the powder of the core shell polymer obtained by drying a latex was immersed in 100 g of methylethylketone (MEK) at 23° C. for 24 hours, thereafter MEK insoluble matter was separated by a centrifuge. MEK insoluble matter was dried and weighed to calculate a weight ratio (%) of MEK insoluble matter to the weight of the core shell polymer.

[3] Evaluation of Viscosity

The viscosity of the composition was measured at a shear rate of 10 cycles/sec at 50° C. by using a CVO rheometer manufactured by BOHLIN INSTRUMENTS Co., Ltd with a cone plate 4°/20 mm.

[4] Evaluation of Toughness

The cured epoxy resin product formed from the epoxy resin composition was evaluated for toughness in accordance with ASTM 5045. A specimen of 60 mm (length)×12 mm (width)×5 mm (thickness) was cut out from the molded body, a pre-crack was put in the specimen, and a three-point bending test was conducted at 23° C. to measure the fracture toughness value (release rate of fracture strain energy) G1c(J/m$^2$) was obtained. This G1c was used as an index of toughness.

[5] Measurement of Flexural Modulus and Flexural Strength

The cured epoxy resin product formed from the epoxy resin composition was evaluated for flexural properties in accordance with JIS 7171. A specimen of 100 mm (length)×10 mm (width)×5 mm (thickness) was cut out from the molded body, and a three-point bending test was conducted at 23° C. to measure the flexural modulus and the flexural strength were obtained.

[6] Evaluation of Heat Resistance of Cured Product

By using the cured product having a weight of 20 mg, the glass transition temperature was measured under a nitrogen flow using a differential scanning calorimeter DSC 220C manufactured by Seiko Instruments Inc. As the measurement method, the temperature was elevated from 50° C. to 220° C. at a temperature elevation rate of 20° C. per minute, and then immediately lessed to 50° C. at a rate of 40° C. per minute to eliminate a thermal history. Thereafter, the temperature was elevated from 50° C. to 220° C. at a temperature elevation rate of 20° C. per minute to measure the glass transition temperature. The cured product from composition used in the evaluation commonly has Tg of 100° C. or more, and the cured product from the composition having Tg of 100° C. or more is regarded to be pass, and the cured product from the composition having Tg of less than 100° C. is regarded to be failure.

A polyol (A), an epoxy resin (B), an amine curing agent (C), and a toughener (D) used in Examples and Comparative Examples are shown below. A dispersion (E) was prepared by dispersing the toughener (D) in the polyol (A) or the epoxy resin (B).

<Polyol (A)>

A-1: PPG400, polyoxypropylenediol having a number average molecular weight of 400 (Actcol D-400: hydroxyl value (OHV) 278 mgKOH/g, manufactured by Mitsui chemicals Inc)

A-2: PPG200, polyoxypropylenediol having a molecular weight of 192 (tripropyleneglycol, hydroxyl value (OHV) 584 mgKOH/g, manufactured by FUJIFILM Wako Pure Chemical Corporation)

A-3: PPT300, polyoxypropylenediol having a number average molecular weight of 300 (Actcol T-300: hydroxyl value (OHV) 530 mgKOH/g, manufactured by Mitsui chemicals Inc)

A-4: PPD1000, polyoxypropylenetriol having a number average molecular weight of 1000 (Actcol T-1000: hydroxyl value (OHV) 109 mgKOH/g, manufactured by Mitsui chemicals Inc)

A-5: PCD500, polycarbonatediol having a number average molecular weight of 500 (DURANOL (registered trademark) T5650E: hydroxyl value (OHV) 226 mgKOH/g, manufactured by Mitsui chemicals Inc)

<Epoxy Resin (B)>

B-1: BPADGE, bisphenol A diglycidyl ether (jER 828 EL, manufactured by Mitsubishi Chemical Inc)

B-2: BDGE, 1,4-butanediol diglycidylether (HELOXY Modifier BD, manufactured by Hexion Specialty Chemicals)

<Amine Curing Agent (C)>

C-1: IPD-D 230, which was obtained by evenly mixing an isophoronediamine (VESTAMIN IPD manufactured by Evonik Inc) and a polypropylene glycol diamine (JEFFAMINE D230 manufactured by Huntsman Inc)

C-2: EMI, 2-ethyl-4-methylimidazole (CUREZOL 2E4MZ manufactured by Shikoku Chemicals Inc)

<Toughener (D)> The synthesis example as set forth below is referred to.

D-1 to D-2: A core shell polymer in which the main component of the core is a butadiene rubber D-3: BD-AN copolymer, butadiene-acrylonitrile copolymer having a carboxyl group at a terminal D-4: PTA3000, allyl group-terminated polypropyleneoxide in which a terminal of polyoxypropylenetriol having a number average molecular weight of 3000 as mentioned below is blocked with allyl group: amount of blocked terminal is 90% or more <Dispersion (E)> The synthesis example as set forth below is referred to.

E-1: Dispersion in which the toughener (D-1) is dispersed in the epoxy resin (B-1) (15% by weight of toughener, 85% by weight of epoxy resin)

E-2: Dispersion in which the toughener (D-2) is dispersed in the epoxy resin (B-1) (30% by weight of toughener, 70% by weight of epoxy resin)

E-3: Dispersion in which the toughener (D-1) is dispersed in the polyol (A-1) (40% by weight of toughener, 60% by weight of polyol)

E-4: Adduct of the toughener (D-3) with the epoxy resin (B-1) (Hypox (registered trademark) RA1340, manufactured by CVC thermoset specialties) (40% by weight of toughener, 60% by weight of epoxy resin)

Synthesis Example: Preparation of Toughener (D-1) and (D-2): Core Shell Polymer 1-1. Formation of Core Layer Synthesis Example 1-1-1; Preparation of Polybutadiene Rubber Latex (R-1)

A pressure resistant polymerization reactor was charged with 200 parts of deionized water, 0.03 parts of tripotassium phosphate, 0.25 parts of potassium dihydrogen phosphate, 0.002 parts of disodium ethylenediaminetetraacetate (EDTA), 0.001 parts of ferrous sulfate heptahydrate (Fe), and 0.2 parts of sodium dodecylbenzenesulfonate (SDS), and the mixture was stirred while sufficiently purging with nitrogen to remove oxygen. Thereafter, 100 parts of butadiene (BD) was introduced into the system, and the temperature was raised to 45° C. 0.015 parts of p-menthanehydroperoxide (PHP) was added and then 0.04 parts of sodium formaldehyde sulfoxylate (SFS) was added to the polymerization reactor, thereby initiating polymerization. At four hours after the polymerization initiation, 0.3 parts of SDS, 0.01 parts of PHP, 0.0015 parts of EDTA, and 0.001 parts of ferrous sulfate heptahydrate (Fe) were introduced thereto. After seven hours of polymerization, 0.4 parts of SDS was added. After ten hours of polymerization, residual monomers were removed by devolatilization under reduced pressure to terminate the polymerization. Thus, a latex (R-1) that contains polybutadiene rubber particles was obtained. The polymerized ratio was 99% or more. The polybutadiene rubber particles contained in the obtained latex had a number average particle diameter of 0.14 µm.

1-2. Preparation of Core Shell Polymer (Formation of Shell Layer)

Synthesis Example 1-2-1; Preparation of Latex (D-1LX) Containing Core Shell Polymer (D-1)

Into a glass reactor having five necks equipped with a reflux condenser, a nitrogen inlet, an apparatus for adding monomers and an emulsifying agent, and a thermometer were charged with 1575 parts (corresponding to 518 parts of polybutadiene rubber particles) of the latex (R-1) obtained in Synthesis Example 1-1 and 315 parts of deionized water, and the mixture was stirred at 60° C. while purging with nitrogen. After 0.024 parts of EDTA, 0.006 parts of ferrous sulfate heptahydrate (Fe), and 1.2 parts of sodium formaldehydesulfoxylate (SES) were added, a mixture of graft monomers (57 parts of butyl acrylate (BA), 32 parts of methylmethacrylate (MMA), 3 parts of 4-hydroxybutylacrylate (4-HBA) and 0.4 parts of cumenehydroperoxide (CHP) was continuously added thereto over a period of 2 hours to carry out graft polymerization. After completion of the addition, the mixture was stirred for further 2 hours to finish the reaction, thereby obtaining a latex (D-1LX) of a core shell polymer (D-1). The polymerized ratio was 99% or more. The core content of the core shell polymer (D-1) was 85% from the charge amount and the reacted rate. A number average particle diameter of the core shell polymer (D-1) contained in the obtained latex was 0.15 µm and MEK insoluble content was 98%. Tg of the shell polymer was calculated to be −16° C. based on the ratios of components.

Synthesis Example 1-2-2; Preparation of Latex (D-2LX) of Core Shell Polymer (D-2)

The latex (D-2LX) of the core shell polymer (D-2) was prepared in the same manner as Synthesis Example 1-2-1 except that BA 35 parts, MMA 50 parts, glycidyl methacrylate (GMA) 7 parts were used in place of BA 57 parts, MMA 32 parts, 4-HBA 3 parts as graft monomers. The polymerized ratio was 99% or more. The core content of the core shell polymer (D-2) was 85% from the charge amount and the reacted rate. A number average particle diameter of the core shell polymer (D-2) contained in the obtained latex was 0.15 µm and MEK insoluble content was 98%. Tg of the shell polymer was calculated to be 20° C. based on the ratios of components.

1-3. Preparation of Dispersion (E-1 to E-3) of Core Shell Polymer (D-1 or D-2) Dispersed in Epoxy Resin (B-1) or Polyol (A-1)

Synthesis Example 1-3-1; Preparation of Dispersion (E-1) Based on Epoxy Resin (B-1)

50 parts of methyl ethyl ketone (MEK) was introduced into a 1 L mixing tank at 25° C., and the aqueous latex (D-1LX) (corresponding to 15 parts of core shell polymer) of the core shell polymer obtained in Synthesis Example 1-2-1 was charged with stirring. After uniformly mixing, 75 parts of water was charged at a feed rate of 60 parts/minute. After completion of the supply, stirring was stopped immediately to obtain floatable aggregates and a slurry liquid containing aqueous phase containing a portion of organic solvent. Then, the aqueous phase was discharged from the discharging port of the tank bottom. 35 parts of MEK was added to the resulting agglomerates, and uniformly mixed to obtain a dispersion in which a core shell polymer was uniformly dispersed. This dispersion was mixed with 85 parts of an epoxy resin (B-1). MEK was removed from this mixture with a rotary evaporator. Thus, dispersion (E-1) in which core shell polymers (D-1) were dispersed in an amount of 15% by weight in the epoxy resin (B-1) was obtained. A viscosity of the dispersion (E-1) was 14000 mPa·s.

Synthesis Example 1-3-2; Preparation of Dispersion (E-2) Based on Epoxy Resin (B-1)

Dispersion (E-2) in which core shell polymers (D-2) were dispersed in an amount of 30% by weight in the epoxy resin (B-1) was obtained in the same manner as Synthesis Example 1-3-1 except that the aqueous latex (D-2LX) of the core shell polymer was used in place of the aqueous latex (D-1LX) of the core shell polymer used in the Synthesis Example 1-3-1.

Synthesis Example 1-3-3; Preparation of Dispersion (E-3) Based on Polyol (A-1)

130 parts of methyl ethyl ketone (MEK) was introduced into a 1 L mixing tank at 25° C., and the aqueous latex (D-1LX) (corresponding to 40 parts of core shell polymer) of the core shell polymer obtained in Synthesis Example 1-2-1 was charged with stirring. After uniformly mixing, 195 parts of water was charged at a feed rate of 60 parts/minute. After completion of the supply, stirring was stopped immediately to obtain floatable aggregates and a slurry liquid containing aqueous phase containing a portion of organic solvent. Then, the aqueous phase was discharged from the discharging port of the tank bottom. 130 parts of MEK was added to the resulting agglomerates, and uniformly mixed to obtain a dispersion in which a core shell polymer was uniformly dispersed. This dispersion was mixed with 60 parts of a polyol (A-1). MEK was removed from this mixture with a rotary evaporator. Thus, dispersion (E-3) in which core shell polymers (D-1) were dispersed in an amount of 40% by weight in the polyol (A-1) was obtained. A viscosity of the dispersion (E-3) was 600 mPa·s.

Synthesis Example; PTA3000, Allyl Group-Terminated Polypropylene Oxide

A pressure resistant polymerization reactor was charged with 100 parts (0.033 equivalents) of polyoxypropylene triol having number average molecular weight of 3000 (Actcol T-3000, manufactured by Mitsui chemicals Inc), and the mixture was stirred while sufficiently purging with nitrogen to remove oxygen. A methanol containing 3.3 times-equivalent of methoxide sodium relative to hydroxyl group of the polyoxypropylene triol was added thereto. Methanol was removed by devolatilization under reduced pressure while stirring. The mixture was purged with nitrogen, 10.2 parts (0.133 equivalents) of allyl chloride was dropped, and the allylation was completed after stirring for the four hours.

To 100 parts of polyoxypropylene oxide having allyl groups at both terminals, 300 parts of n-hexane, 300 parts of water were added and stirred to remove water by the centrifugation. 300 parts of water was added to hexane solution to remove water by the centrifugation, and hexane was removed by devolatilization under reduced pressure while stirring, to prepare branched polypropylene oxide (PTA3000) having a number average molecular weight of 3000 in which 90% of terminals of the polymer was substituted with allyl group.

Examples 1 to 17, Comparative Examples 1 to 12

Each of the components was weighed according to a formulation shown in Tables 1 to 3, and these components were homogeneously mixed by using stirring equipment (planetary centrifugal mixer, AwatoriRentaro, manufactured by Thinky). The mixture was defoamed under reduced pressure to obtain an epoxy resin composition. The obtained composition was cured at 23° C. for 24 hours, and at 130° C. for three hours to prepare a cured product. In Example 16 and Comparative Example 11, the obtained composition was cured at 80° C. for 2 hours, and at 150° C. for 3 hours to prepare a cured product. The fracture toughness, the flexural modulus, the flexural strength and the heat resistance were evaluated by using the cured product obtained. Results are shown in Tables 1 to 3.

TABLE 1

| | | | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|---|
| Amount compounded (parts by weight) | (A) | Polyol | A-1 | PPG400 (OHV 278 mgKOH/g) | 1.6 | 2.0 | 3.0 | 4.0 | 3.0 | | 1.2 | | | 6.0 |
| | | | A-2 | PPG200 (OHV 584 mgKOH/g) | | | | | | | | | 1.2 | |
| | | | A-3 | PPT300 (OHV 530 mgKOH/g) | | | | | | | | | | |
| | | | A-4 | PPD1000 (OHV 109 mgKOH/g) | | | | | | | | | | |
| | | | A-5 | PCD500 (OHV 226 mgKOH/g) | | | | | | | | | | |
| | (B) | Epoxy resin | B-1 | BPADGE | 55.8 | 58.1 | 63.8 | 69.4 | 70.4 | 75.1 | 72.9 | 77.4 | 72.9 | 48.4 |
| | | | B-2 | BDGE | | | | | | | | | | |
| | (C) | Amine curing agent | C-1 | IPDA/D230 | 19.9 | 19.9 | 19.9 | 19.9 | 19.9 | 19.9 | 20.6 | 20.6 | 20.6 | 18.9 |
| | | | C-2 | EMI | | | | | | | | | | |
| | (D) | Toughener | D-4 | PTA3000 | | | | | | | | | | |
| | (E) | Dispersion in which (D) is dispersed in (A) or (B) | E-1 | (D-1) 15% by weight (B-1) 85% by weight | 22.7 | 20.0 | 13.3 | 6.7 | | | 5.3 | | 5.3 | 26.7 |
| | | | E-2 | (D-2) 30% by weight (B-1) 70% by weight | | | | | | 6.7 | | | | |
| | | | E-3 | (D-1) 40% by weight (A-1) 60% by weight | | | | | | | 5.0 | 2.0 | | |
| | | | E-4 | (D-3) 40% by weight (B-1) 60% by weight | | | | | | | | | | |
| | | (Total amount) | | | 100.0 | 100.0 | 100.0 | 100.0 | 100.0 | 100.0 | 100.0 | 100.0 | 100.0 | 100.0 |
| Ratios of composition (% by weight) | (A) | Polyol | A-1 | PPG400 | 1.6 | 2.0 | 3.0 | 4.0 | 3.0 | 3.0 | 1.2 | 1.2 | | 6.0 |
| | | | A-2 | PPG200 | | | | | | | | | 1.2 | |
| | | | A-3 | PPT300 | | | | | | | | | | |
| | | | A-4 | PPT1000 | | | | | | | | | | |
| | | | A-5 | PCD500 | | | | | | | | | | |
| | (B) | Epoxy resin | B-1 | BPADGE | 75.1 | 75.1 | 75.1 | 75.1 | 75.1 | 75.1 | 77.4 | 77.4 | 77.4 | 71.1 |
| | | | B-2 | BDGE | | | | | | | | | | |
| | (C) | Amine curing agent | C-1 | IPDA/D230 | 19.9 | 19.9 | 19.9 | 19.9 | 19.9 | 19.9 | 20.6 | 20.6 | 20.6 | 18.9 |
| | | | C-2 | EMI | | | | | | | | | | |
| | (D) | Toughener | D-1 | Core shell polymer | 3.4 | 3.0 | 2.0 | 1.0 | | | 0.8 | 0.8 | 0.8 | 4.0 |
| | | | D-2 | Core shell polymer | | | | | 2.0 | | | | | |
| | | | D-3 | Bd-AN Copolymer | | | | | | 2.0 | | | | |
| | | | D-4 | PTA3000 | | | | | | | | | | |
| | | (Total amount) | | | 100.0 | 100.0 | 100.0 | 100.0 | 100.0 | 100.0 | 100.0 | 100.0 | 100.0 | 100.0 |
| | | Ratio of ((D) % by weight)$^2$/ (A) % by weight | | | 7.2 | 4.5 | 1.3 | 0.3 | 1.3 | 1.3 | 0.5 | 0.5 | 0.5 | 2.7 |
| | | Ratio of (D)/(A) | | | 68/32 | 60/40 | 40/60 | 20/80 | 40/60 | 40/60 | 40/60 | 40/60 | 40/60 | 40/60 |
| | | Ratio of (B)/(C) | | | 100/27 | 100/27 | 100/27 | 100/27 | 100/27 | 100/27 | 100/27 | 100/27 | 100/27 | 100/27 |
| Evaluation | | ToughnessG1c (J/m$^2$) | | | 750 | 710 | 640 | 500 | 650 | 680 | 510 | 520 | 420 | 970 |
| | | Flexural modulus (GPa) | | | 2.61 | 2.69 | 2.84 | 2.97 | 2.84 | 2.84 | 2.70 | 2.70 | 3.14 | 2.81 |
| | | Flexural strength (MPa) | | | 112 | 115 | 117 | 124 | 116 | 118 | 118 | 118 | 132 | 110 |
| | | Heat resistance (Pass: Tg ≥ 100° C., Failure: Tg < 100° C.) | | | Pass | Pass | Pass | Pass | Pass | Pass | Pass | Pass | Pass | Pass |

TABLE 2

| | | | | Example 11 | Example 12 | Example 13 | Example 14 | Example 15 | Example 16 | Example 17 | Comparative Example 1 | Comparative Example 2 | Comparative Example 3 |
|---|---|---|---|---|---|---|---|---|---|---|---|---|---|
| Amount compounded (parts by weight) | (A) Polyol | A-1 | PPG400 (OHV 278 mgKOH/g) | | 3.0 | 3.0 | 7.2 | | | | | | 1.0 |
| | | A-2 | PPG200 (OHV 584 mgKOH/g) | | | | | | | | | | |
| | | A-3 | PPT300 (OHV 530 mgKOH/g) | 6.0 | | | | | | | | | |
| | | A-4 | PPD1000 (OHV 109 mgKOH/g) | | | | | | | | | | |
| | | A-5 | PCD500 (OHV 226 mgKOH/g) | | | | | | | 1.2 | | | |
| | (B) Epoxy resin | B-1 | BPADGE | 48.4 | 72.1 | 75.1 | 58.3 | 67.0 | 94.1 | 72.9 | 79.0 | 46.8 | 52.4 |
| | | B-2 | BDGE | | | | | | 7.4 | | | | |
| | (C) Amine curing agent | C-1 | IPDA/D230 | 18.9 | 19.9 | 19.9 | 18.5 | 20.6 | | 20.6 | 21.0 | 19.9 | 19.9 |
| | | C-2 | EMI | | | | | | 3.9 | | | | |
| | (D) Toughener | D-4 | PTA3000 | | | 2.0 | | | | | | | |
| | (E) Dispersion in which (D) is dispersed in (A) or (B) | E-1 | (D-1) 15% by weight (B-1) 85% by weight | 26.7 | | | | | | 5.3 | | 33.3 | 26.7 |
| | | E-2 | (D-2) 30% by weight (B-1) 70% by weight | | | | | 16.0 | | | | | |
| | | E-3 | (D-1) 40% by weight (A-1) 60% by weight | | | | | | 5.0 | 2.0 | | | |
| | | E-4 | (D-3) 40% by weight (B-1) 60% by weight | | 5.0 | | | | | | | | |
| | | | (Total amount) | 100.0 | 100.0 | 100.0 | 100.0 | 100.0 | 100.0 | 100.0 | 100.0 | 100.0 | 100.0 |
| Ratios of composition (% by weight) | (A) Polyol | A-1 | PPG400 | | 3.0 | 3.0 | 7.2 | 3.0 | 1.2 | 1.2 | | | 1.0 |
| | | A-2 | PPG200 | | | | | | | | | | |
| | | A-3 | PPT300 | 6.0 | | | | | | | | | |
| | | A-4 | PPT1000 | | | | | | | | | | |
| | | A-5 | PCD500 | | | | | | | | | | |
| | (B) Epoxy resin | B-1 | BPADGE | 71.1 | 75.1 | 75.1 | 69.5 | 67.0 | 94.1 | 77.4 | 79.0 | 75.1 | 75.1 |
| | | B-2 | BDGE | | | | | | 7.4 | | | | |
| | (C) Amine curing agent | C-1 | IPDA/D230 | 18.9 | 19.9 | 19.9 | 18.5 | 20.6 | | 20.6 | 21.0 | 19.9 | 19.9 |
| | | C-2 | EMI | | | | | | 3.9 | | | | |
| | (D) Toughener | D-1 | Core shell polymer | 4.0 | | | | 2.0 | 0.8 | 0.8 | 0.0 | 5.0 | 4.0 |
| | | D-2 | Core shell polymer | | | | 4.8 | | | | | | |
| | | D-3 | Bd-AN Copolymer | | 2.0 | | | | | | | | |
| | | D-4 | PTA3000 | | | 2.0 | | | | | | | |
| | | | (Total amount) | 100.0 | 100.0 | 100.0 | 100.0 | 100.0 | 100.0 | 100.0 | 100.0 | 100.0 | 100.0 |
| | | | Ratio of ((D) % by weight)$^2$/(A) % by weight | 2.7 | 1.3 | 1.3 | 3.2 | 1.3 | 0.5 | 0.5 | | | 16.0 |
| | | | Ratio of (D)/(A) | 40/60 | 40/60 | 40/60 | 40/60 | 40/60 | 40/60 | 40/60 | | 100/0 | 80/20 |
| | | | Ratio of (B)/(C) | 100/27 | 100/27 | 100/27 | 100/27 | 100/28 | 100/4 | 100/27 | 100/27 | 100/27 | 100/27 |
| Evaluation | | | ToughnessG1c (J/m$^2$) | 950 | 450 | 700 | 1200 | 1050 | 140 | 480 | 227 | 790 | 760 |
| | | | Flexural modulus (GPa) | 2.89 | 2.74 | 2.69 | 2.71 | 2.65 | 2.46 | 2.72 | 2.60 | 2.40 | 2.52 |
| | | | Flexural strength (MPa) | 116 | 116 | 110 | 106 | 115 | 75 | 115 | 113 | 105 | 110 |
| | | | Heat resistance (Pass: Tg ≥ 100° C., Failure: Tg < 100° C.) | Pass | Pass | Pass | Pass | Pass | Pass | Pass | Pass | Pass | Pass |

TABLE 3

| | | | | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| Amount compounded (parts by weight) | (A) Polyol | A-1 | PPG400 (OHV 278 mgKOH/g) | 5.0 | | | | | | 9.0 | | |
| | | A-2 | PPG200 (OHV 584 mgKOH/g) | | | | | | | | | |
| | | A-3 | PPT300 (OHV 530 mgKOH/g) | | | | | | | | | |
| | | A-4 | PPD1000 (OHV 109 mgKOH/g) | | | 1.2 | | | | | | |
| | | A-5 | PCD500 (OHV 226 mgKOH/g) | | | | | | | | | |

TABLE 3-continued

| | | | | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| (B) | Epoxy resin | B-1 | BPADGE | 75.1 | 66.1 | 72.9 | 14.4 | 67.6 | 75.1 | 62.5 | 70.5 | 96.0 |
| | | B-2 | BDGE | | | | | | | | 7.8 | |
| (C) | Amine curing agent | C-1 | IPDA/D230 | 19.9 | 20.5 | 20.6 | 18.9 | 19.9 | 19.9 | 18.5 | 21.7 | |
| | | C-2 | EMI | | | | | | | | | 4.0 |
| (D) | Toughener | D-4 | PTA3000 | | | | | | 5.0 | | | |
| (E) | Dispersion in which (D) is dispersed in (A) or (B) | E-1 | (D-1) 15% by weight (B-1) 85% by weight | | 13.3 | 5.3 | 66.7 | | | | | |
| | | E-2 | (D-2) 30% by weight (B-1) 70% by weight | | | | | | | 10.0 | | |
| | | E-3 | (D-1) 40% by weight (A-1) 60% by weight | | | | | | | | | |
| | | E-4 | (D-3) 40% by weight (B-1) 60% by weight | | | | | 12.5 | | | | |
| | (Total amount) | | | 100.0 | 100.0 | 100.0 | 100.0 | 100.0 | 100.0 | 100.0 | 100.0 | 100.0 |
| Ratios of composition (% by weight) | (A) Polyol | A-1 | PPG400 | 5.0 | | | | | | 9.0 | | |
| | | A-2 | PPG200 | | | | | | | | | |
| | | A-3 | PPT300 | | | | | | | | | |
| | | A-4 | PPT1000 | | | | 1.2 | | | | | |
| | | A-5 | PCD500 | | | | | | | | | |
| | (B) Epoxy resin | B-1 | BPADGE | 75.1 | 77.4 | 77.4 | 71.1 | 75.1 | 75.1 | 69.5 | 70.5 | 96.0 |
| | | B-2 | BDGE | | | | | | | | 7.8 | |
| | (C) Amine curing agent | C-1 | IPDA/D230 | 19.9 | 20.6 | 20.6 | 18.9 | 19.9 | 19.9 | 18.5 | 21.7 | |
| | | C-2 | EMI | | | | | | | | | 4.0 |
| | (D) Toughener | D-1 | Core shell polymer | 0.0 | 2.0 | 0.8 | 10.0 | | | | | |
| | | D-2 | Core shell polymer | | | | | | | 3.0 | | |
| | | D-3 | Bd-AN Copolymer | | | | | 5.0 | | | | |
| | | D-4 | PTA3000 | | | | | | 5.0 | | | |
| | (Total amount) | | | 100.0 | 100.0 | 100.0 | 100.0 | 100.0 | 100.0 | 100.0 | 100.0 | 100.0 |
| | Ratio of ((D) % by weight)$^2$/ (A) % by weight | | | | 0.5 | | | | | 1.0 | | |
| | Ratio of (D)/(A) | | | 0/100 | 100/0 | | | 100/0 | 100/0 | 40/60 | 100/0 | |
| | Ratio of (B)/(C) | | | 100/27 | 100/27 | 100/27 | 100/27 | 100/26 | 100/27 | 100/27 | 100/28 | 100/4 |
| Evaluation | ToughnessG1c (J/m$^2$) | | | 140 | 600 | 480 | 990 | 650 | 710 | 1000 | 330 | 100 |
| | Flexural modulus (GPa) | | | 3.05 | 2.48 | 2.58 | 2.10 | 2.42 | 2.38 | 2.80 | 2.52 | 2.42 |
| | Flexural strength (MPa) | | | 123 | 101 | 105 | 91 | 108 | 103 | 105 | 115 | 72 |
| | Heat resistance (Pass: Tg ≥ 100° C., Failure: Tg < 100° C.) | | | Pass | Pass | Pass | Pass | Pass | Pass | Failure | Pass | Pass |

From the results of Tables 1 to 3, the cured product obtained from the epoxy resin composition of the present invention had excellent heat resistance in addition to high flexural modulus, high flexural strength, and high toughness.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. An epoxy resin composition, comprising:
a polyol (A) having a hydroxyl value of 130 to 600 mgKOH/g and a number average molecular weight of 100 or more and less than 1000;
an epoxy resin (B);
an amine curing agent (C); and
a toughener (D),
wherein:
the amine curing agent (C) is at least one selected from an alicyclic amine, an amine having an ether bond, and an imidazole,
the toughener (D) is at least one selected from the group consisting of a core shell polymer containing a core layer and a shell layer grafted on the core layer, a butadiene-acrylonitrile copolymer having a carboxyl group at a terminal, and a polyalkyleneoxide having an allyl group at a terminal,
the core layer of the core shell polymer has a glass transition temperature of 0° C. or less,
the epoxy resin composition contains the amine curing agent (C) in an amount of 5 parts by weight or more and 100 parts by weight or less, per 100 parts by weight of the epoxy resin (B), and the epoxy resin composition satisfies the following numerical formulas (1) and (2):

$$0.1 \le Wt^2/Wp \le 8.0 \quad (1)$$

$$0.1 \le Wp \le 8.0 \quad (2)$$

where Wp represents the polyol (A) content of the composition in % by weight and Wt represents the toughener (D) content of the composition in % by weight, both relative to a total amount of the polyol (A), the epoxy resin (B), the amine curing agent (C), and the toughener (D).

2. The epoxy resin composition according to claim 1, wherein the polyol (A) is a polyether polyol or a polycarbonate polyol.

3. The epoxy resin composition according to claim 2, wherein the polyol (A) is at least one selected from the group consisting of a polyoxypropylene diol, a polyoxypropylene triol, a polyoxybutylene diol, a polyoxybutylene triol, and a polycarbonate diol.

4. The epoxy resin composition according to claim 1, wherein the toughener (D) is the core shell polymer, and wherein the core shell polymer has a number average particle diameter of 0.01 to 0.6 μm.

5. The epoxy resin composition according to claim 1, wherein the toughener (D) is the core shell polymer, and wherein the core layer comprises at least one selected from the group consisting of a diene rubber, a (meth)acrylate rubber, an organosiloxane rubber, a styrene polymer, and a (meth)acrylate polymer.

6. The epoxy resin composition according to claim 1, wherein the toughener (D) is the core shell polymer, and wherein the shell layer comprises a polymer having a glass transition temperature of −40° C. to 60° C.

7. The epoxy resin composition according to claim 1, wherein the toughener (D) is the core shell polymer, and wherein the shell layer comprises a polymer comprising 20 to 90% by weight of an alkyl (meth)acrylate monomer unit having a linear or branched alkyl group of 4 to 10 carbon atoms.

8. The epoxy resin composition according to claim 1, wherein the toughener (D) is the core shell polymer, and wherein the core shell polymer comprises the core layer in an amount of 70 to 95% by weight, relative to the total weight of the core shell polymer.

9. The epoxy resin composition according to claim 1, wherein the toughener (D) is the core shell polymer, and wherein the shell layer comprises a polymer comprising a (meth)acrylate monomer, an aromatic vinyl monomer, a hydroxyl group-containing vinyl monomer, and an epoxy group-containing vinyl monomer.

10. The epoxy resin composition according to claim 1, wherein the toughener (D) is the core shell polymer, and wherein the shell layer comprises a polymer polymerized with 20 to 90% by weight of butyl acrylate, 20 to 70% by weight of methylmethacrylate, 1 to 20% by weight of 4-hydroxy butylacrylate, and 0 to 20% by weight of glycidyl(meth)acrylate.

11. The epoxy resin composition according to claim 1, wherein the toughener (D) is the core shell polymer, and wherein the shell layer comprises a polymer polymerized with 20 to 90% by weight of butyl acrylate, 20 to 70% by weight of methylmethacrylate, and 1 to 20% by weight of glycidyl(meth)acrylate.

12. A cured product of the epoxy resin composition according to claim 1.

13. The cured product according to claim 12, wherein the cured product has a fracture toughness, as measured by ASTM 5045, of 250 J/m$^2$ or more.

14. The cured product according to claim 12, wherein the cured product has a flexural modulus, as measured by JIS 7171, of more than 2.58 GPa, a flexural strength, as measured by JIS 7171, of more than 100 MPa, and a glass transition temperature, as measured by differential scanning calorimeter, of 100° C. or more.

* * * * *